United States Patent [19]
Vissers

[11] 3,735,904
[45] May 29, 1973

[54] DEVICE FOR SPREADING, SOWING OR DELIVERING POWDERED OR GRANULAR MATERIAL

[75] Inventor: Herbert Vissers, Nieuw-Vennep, Netherlands

[73] Assignee: H. Vissers N. V., Nieuw-Vennep, Netherlands

[22] Filed: Apr. 13, 1971

[21] Appl. No.: 133,678

Related U.S. Application Data

[63] Continuation-in-part of Ser. No. 807,365, March 14, 1969, abandoned.

[30] Foreign Application Priority Data

March 21, 1968 Netherlands....................6804010
Jan. 29, 1969 Netherlands....................6901402

[52] U.S. Cl. ................222/412, 198/213, 219/83.18
[51] Int. Cl..............................................G01f 11/00
[58] Field of Search......................222/412, 410, 413, 222/333, 59, 414; 198/64, 43, 213; 302/50; 214/83.18, 17 D, 17 A

[56] References Cited

UNITED STATES PATENTS

| | | | |
|---|---|---|---|
| 2,393,572 | 1/1946 | Soma | 198/213 |
| 2,511,246 | 6/1950 | Chamberlin | 214/83.18 |
| 3,151,749 | 10/1964 | Long | 198/213 X |
| 3,129,851 | 4/1964 | Seymour et al. | 222/59 X |

Primary Examiner—Samuel F. Coleman
Assistant Examiner—Norman L. Stack, Jr.
Attorney—Snyder and Butrum

[57] ABSTRACT

The bed of powdered, granular or particulate material contained within the hopper-like body is assured of ultimate gravity discharge through a relatively small discharge opening in the body by providing a conveyer screw which displaces the material of the bed towards such opening so that the material tends to form a pile over such opening. Compaction of the material by the conveyer screw is minimized by so mounting the conveyer screw that its discharge end in particular tends to follow the level of the pile of material and therefore discharges material to the top of the pile. This is accomplished by mounting the conveyer screw so as to swing in a vertical plane about a pivot point remote from the opening and thereby leaving the discharge end of the conveyor screw free to assume a position in which it remains essentially uncovered by the material.

21 Claims, 8 Drawing Figures

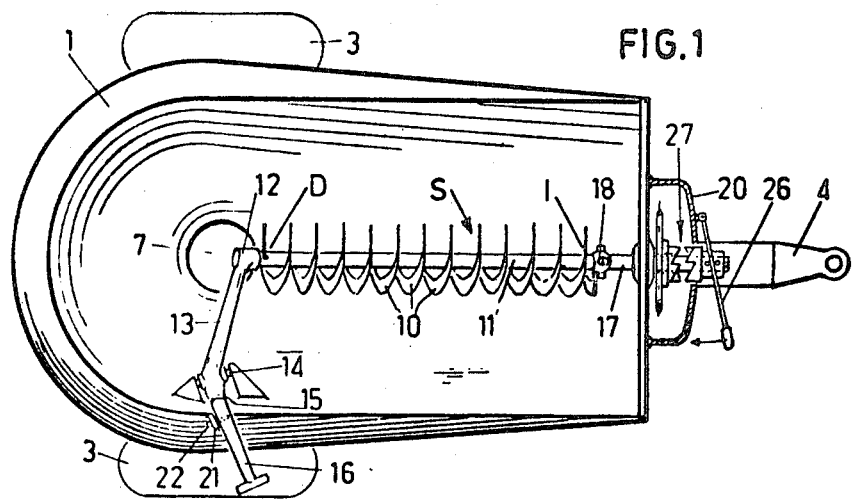
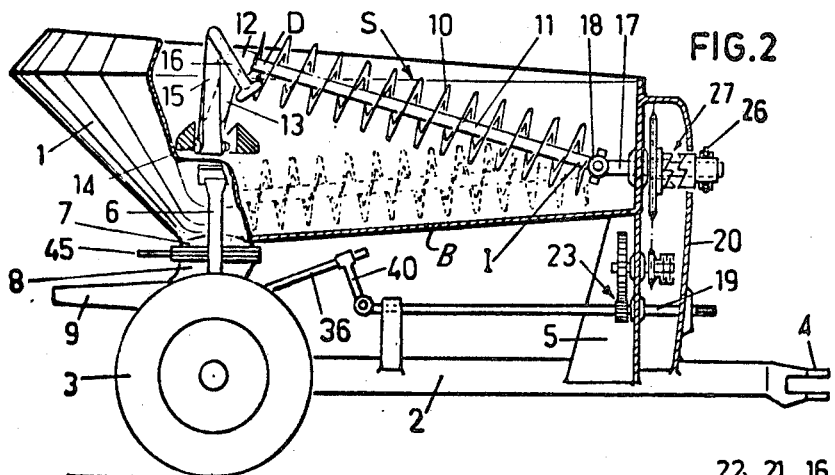
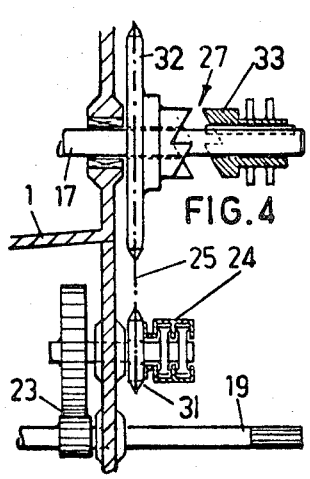
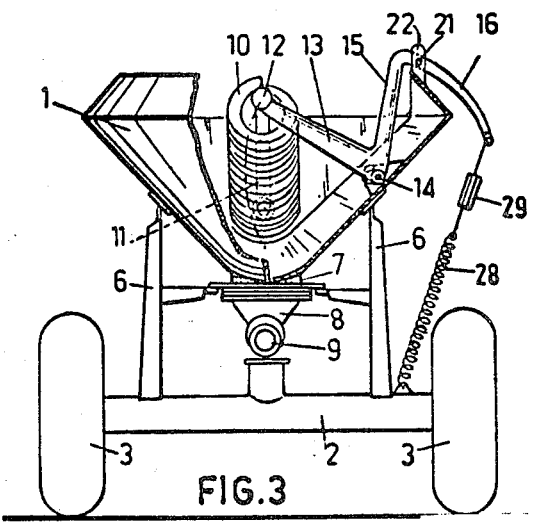

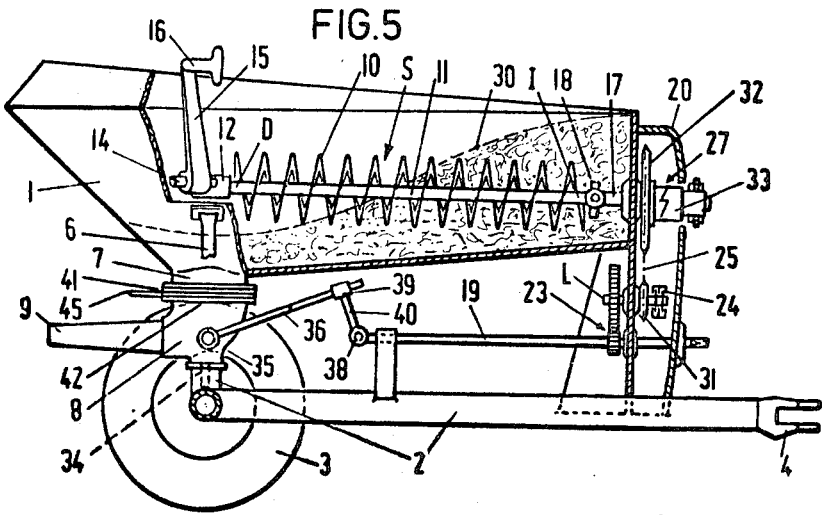
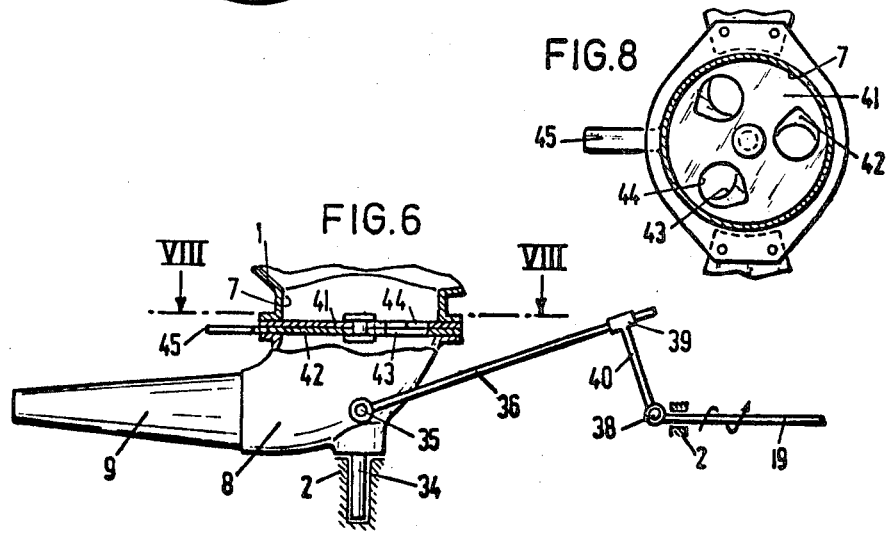
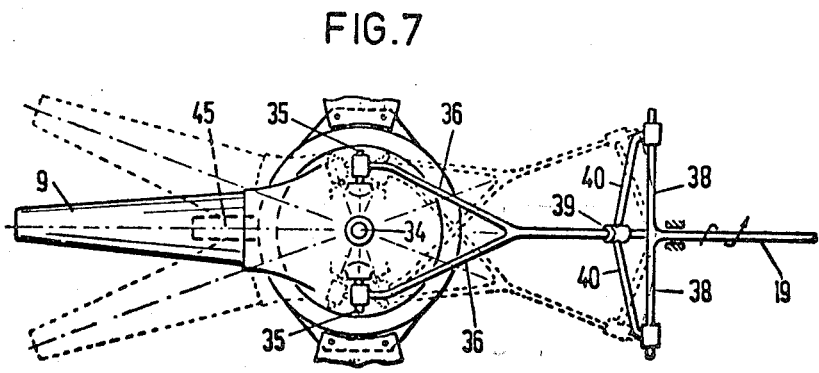

3,735,904

DEVICE FOR SPREADING, SOWING OR DELIVERING POWDERED OR GRANULAR MATERIAL

CROSS REFERENCE TO RELATED APPLICATION

This application is a continuation-in-part of my co-pending application Ser. No. 807,365 filed Mar. 14, 1969 and now abandoned.

BACKGROUND OF THE INVENTION

There are many practical applications in which particulate or granular material is required to be fed from a bed thereof to a discharge or delivery mechanism which effects a uniform distribution of the material. A common example is encountered in connection with the distribution of chemical fertilizer over the surface of the ground.

In such instances, a bed of granular chemical fertilizer contained within a hopper-like body flows by gravity through a relatively small opening to a distributor mechanism which is intended to deliver the fertilizer uniformly to the ground surface over which the body travels. Although it would be possible to construct the body so that all of the material contained therein would feed by gravity to the discharge opening, such an arrangement would cause undue compaction of material unless the depth of the bed were not great. In such a situation, however, the capacity of the body is seriously limited. In order to provide a reasonable capacity for the body without causing undue compaction due to the depth of the bed of material therein, the body shape must be such that the entire contents of the bed will not flow or feed by gravity to the discharge opening. Consequently, some means must be provided to assure that all of the material eventually reaches the discharge opening.

If a conveyer screw is located along the bottom of the body for this latter purpose, it will be buried in the bed so that it will cause compaction of the material at its discharge end. Particularly with materials such as chemical fertilizers, this compaction causes agglomeration of the material into sticky lumps or masses, aggravated at least in part by heating of the material as it is physically moved and compacted. As a result, the discharge opening itself and/or the distributing mechanism which receives the material through the discharge opening becomes clogged or partially blinded. This, in turn, will prevent a uniform and consistent delivery of the material from the distributing mechanism.

BRIEF SUMMARY OF THE INVENTION

The present invention is directed to a device for distributing particulate, powdered or granular material uniformly over a surface and which includes an elongate body of hopper-like form provided with a relatively small discharge opening through which material is adapted to flow by gravity to a distributing mechanism and, in combination with such an arrangement, a conveyer screw within the body to assure that substantially the entirety of a bed of particulate material received in the body ultimately will reach the discharge opening for gravity flow therethrough. The conveyer screw is pivotally mounted adjacent its intake end remote from the discharge opening so as to allow the discharge end of the conveyer screw which is positioned or located in the region above the discharge opening to rise and fall according to the level of material piled above the discharge opening so that the discharge end of the conveyer screw always discharges material into a region at or near the top of such pile. In this fashion, undue compaction of the material is avoided and, at the same time, less power is required to drive the conveyer screw.

A further feature of the invention involves the utilization of the assembly described above in conjunction with a lever device which is rotatably connected to the discharge end of the conveyer screw and is pivotally mounted on the body so as to allow manual lifting of the discharge end of the conveyer screw as material is delivered into the body so as to assure that when the body is filled, the discharge end of the conveyer screw will be disposed essentially in an exposed condition so that it will deliver material to the top layer of the bed of material in the body.

A further feature of the present invention involves the combination as above described including means for distributing the material flowing through the discharge opening, such means being of a form uniformly to distribute the material over the ground surface and having a drive mechanism effecting a continuous drive thereto as the body is travelled over the ground surface. In conjunction with this, a selectively operable coupling device is provided selectively to couple the conveyer screw to this main drive. Further, the drive for the conveyer screw may incorporate a torque-limiting clutch to prevent excessive torque to be applied to the conveyer screw.

The pivotal mounting of the conveyer screw which allows the discharge end thereof to swing within a vertical plane to rise and fall with the level of the bed of material in the body conveniently takes the form of a universal joint which also couples the conveyer screw to its drive means.

BRIEF DESCRIPTION OF THE DRAWING FIGURES

FIG. 1 is a top plan view of a device constructed in accordance with the present invention;

FIG. 2 is a side elevation of the assembly shown in FIG. 1 with portions thereof broken away to show details of internal construction;

FIG. 3 is a front elevational view of the assembly shown in FIGS. 1 and 2 and with portions thereof broken away to illustrate details of a modification of the present invention;

FIG. 4 is a sectional view illustrating details of the main drive and the drive for the conveyer screw;

FIG. 5 is a view similar to FIG. 2 but illustrating the manner in which the conveyer screw seeks a level with respect to the bed of material in the body to avoid undue compaction of the material;

FIG. 6 is on a larger scale a side view of the distributing mechanism of the device of FIG. 1, a part of said side view being partly broken out;

FIG. 7 is a bottom view of FIG. 6; and

FIG. 8 is a section along line VIII—VIII of FIG. 6.

DETAILED DESCRIPTION OF THE INVENTION

With reference now more particularly to FIGS. 1 and 2, the material-receiving body is indicated generally by the reference character 1 and will be seen to be of elongate form having sloping side walls and a sloping front wall merging with a bottom wall portion B provided adjacent one end thereof a relatively small discharge opening 7. The body is supported on a frame 2 provided with suitable supporting wheels 3 and having a hitch 4 at its front end for attachment to a suitable towing vehicle such as a tractor. The uprights 5 and 6 are fixed to the frame assembly 2 and support the body 1 in elevated position thereabove, substantially as is shown.

Beneath the body 1 and in registry with the discharge opening 7 therein a distributing mechanism, shown in FIG. 6, is provided, said distributing mechanism comprising a bowl 8 mounted on the frame 2 for swinging movement about its vertical shaft 34. The bowl 8 is provided at both sides with diametrically opposed horizontal pens 35 pivotably engaged by a forked element 36. The bowl 8 receives a swinging movement from the continuously rotating shaft 19 which at its end facing the spout 9 has two diametrically opposed arms 38. The shaft 19 has provision at its forward end, as is shown in FIG. 2 for connection to the conventional power take-off of the towing vehicle. The forked element 36 is rotatably mounted in a sleeve 39 secured to two rods 40 which are pivotably mounted on crank arms 38. Due to rotation of the shaft 19 a spout 9 secured and communicating with the bowl 8 swings to and fro. This distributing mechanism is described in the Australian patent specification No. 248,303.

Between the opening 7 of the body 1 and the bowl 8 an adjustable discharge flow regulator of the distributing mechanism is provided, said discharge flow regulator comprising a plate 41 secured to the body 1 beneath the opening 7, and an adjustable plate 42 swingably mounted at plate 41. Said plate 42 having a lever 45 for adjusting the angular position of apertures 43 of plate 42 relatively to apertures 44 of plate 41 so as to more or less cover the apertures 44 of plate 41 by means of plate 42. During distribution of a kind of particulate material on a field the adjustable plate 42 is maintained in one and the same position. Due to the distributing mechanism being driven continuously a uniform distribution of particulate material over the ground surface is effected.

Although the side walls and the front walls of the body are sloped sufficiently such that the particulate material bed will be funnelled thereby toward the bottom of the body, the bottom portion B of the body is elongate and generally horizontal in order to achieve an adequate capacity for the body. As a result, material residing on the bottom wall portion B remote from the discharge opening 7 will not all flow naturally by gravity to and through the discharge opening 7. In order to assure that the bed of material initially placed in the body ultimately will reach the discharge opening 7 for gravity flow therethrough and such a uniform distribution onto the ground surface, the conveyer screw indicated generally by the reference character S is provided. The conveyer screw is of conventional construction embodying a shaft or central portion 11 to which is fixed a helical flight portion 10 and the direction of rotation of the conveyor screw is such as to cause material to be fed from the direction of its intake end I to its discharge end D. A particular feature of the invention resides in the manner in which the conveyer screw S is mounted within the body so as to minimize or avoid compaction of the particulate material which may cause agglomeration thereof leading to partial or complete blockage or blinding of the discharge opening 7 and partial or complete blocking of the distributor mechanism.

The manner in which the above is accomplished is by mounting the conveyer screw S such that its intake end I remote from the discharge opening 7 allows the conveyer screw to move arcuately within a generally vertical plane such that the discharge end D may rise and fall with the level of the bed of material within the body so that it is, in general, partially or completely exposed such that the area into which the particulate material being conveyed thereby is discharged, is a region in which little or no particulate material is present. Thus, the particulate material as fed by the conveyer screw S does not encounter obstructions which will cause it to be compacted as would be the case were, for example, the conveyer screw to remain buried within the bed of material as for example in the position indicated by dashed lines in FIG. 2.

The discharge end D of the conveyer screw and, in particular, extremity of the shaft 11 may be journalled in a member 12, which forms part of a lever system whereby to allow for manual elevation of the discharge end of the conveyer screw. In particular, the journalling portion 12 is fixed to an arm portion 13 pivoted as at 14 to the body and having further arm portions 15 and 16, the latter of which forms a handle which may be manually grasped to elevate the feed screw to the position shown for example in FIG. 3. This would be the normal position of the feed screw when the body is to be filled with a bed of particulate material and in order to retain the feed screw in this position during the filling operation, the latch pin 21 may be projected through the ears 22 fixed to the body 1 with the pin 21 projecting through a suitable opening in the handle portion 16 to retain the conveyer screw in the aforesaid position. When the bed of material is introduced into the body with the conveyer screw in the position just mentioned, a major portion of the conveyer screw may be buried in the material but the discharge end D thereof will be at least partially exposed. After filling, the pin 21 is of course removed so as to allow the conveyer screw to "float" within the bed of material retaining the discharge end thereof in partially exposed condition for the purposes above described. It will be noted that the rotation of the conveyer screw tends naturally to cause it to react against the bed of material and lift upwardly so as to retain the exposed condition particularly of the discharge end thereof as is described. Should the conveyer screw be so heavy as tends to "float" in a more submerged position within the particulate material than is desirable, partial counterweighting of the weight of the conveyer screw may be utilized. Such a mechanism is shown in FIG. 3 wherein a tension spring 28 is shown anchored at one end to the frame 2 and at its opposite end, through a suitable adjustable coupling 29 to the handle portion 16. Thus, when the pin 21 is removed, the spring 28 through tension counterbalances a part of the weight of the conveyer screw mechanism. This counterbalancing force is adjustable, of course, by suitable extension or contraction of the device 29 which may either relax or increase the tension described. The preferred manner of effecting the pivotal or swinging mounting of the conveyer screw S and for effecting the rotary drive thereto takes the form of a counter shaft 17 suitably journalled in the front wall of the body as is indicated in FIG. 4, which counter shaft is connected to the shaft 11 of the conveyer screw S by means of a universal joint 18. This arrangement will allow the conveyer screw to "float" as described hereinbefore and will, at the same time, effect the requisite rotary drive thereto. The counter shaft 17 receives its drive from the main drive shaft 19, as is shown in FIG. 4, through the medium of a gear set 23 driving the lay shaft L which in turn drives the sprocket 31 through the medium of a torque-limiting coupling 24. The driving portion of the torque-limiting coupling 24 is connected to the lay shaft L and the driven portion carries the sprocket 31 which is connected, by means of a suitable chain 25 to a sprocket 32 journalled on the shaft 17. As is shown in FIG. 4, the sprocket 32 is provided with teeth on its hub which are adapted to cooperate with a toothed collar 33 which is keyed or otherwise suitable splined to the shaft 17 to allow the collar 33 to move axially thereof while being rotated thereby selectively to couple the shaft 17 through the sprocket 32 to the main drive shaft 19. Thus, it will appear from FIG. 4 that manual coupling of the conveyer screw may be effected by shifting the collar 33 into operative engagement with the sprocket 32 as by means of a shift lever 26 as shown in FIG. 1 whereas, additionally, the torque which may be applied to the conveyer screw is limited by the coupling 24. In actual operation, it may be desirable initially to disconnect the drive to the conveyer screw until the bed of material has been depleted in the region above the discharge opening 7, whereafter the conveyer screw may be connected through the collar 33 to the main drive shaft 19 to move the remaining portion of the bed into a pile in the region above the discharge opening 7.

The tendency for the conveyer screw to "float" in the bed of material is illustrated in FIG. 5 wherein the bed of material is indicated by the reference character 30 and wherein it will be seen that the conveyer screw tends to float therein such that at least portions thereof remain in exposed condition. As described hereinbefore, the conveyer screw is ordinarily raised to its uppermost position when the material is initially placed in the body 1 and, thereafter, it tends to fall generally with the level of the material remaining as the material is distributed and, when driven, tends to react against the bed and seek an equilibrium position with respect thereto in which at least the discharge end of the conveyer is partially exposed so that it will discharge and convey material toward a region above the discharge opening 7 wherein little resistance is met. This avoids the compaction heretofore mentioned and, further, decreases the power consumed by the conveyer screw S.

What is claimed is:

1. A device for discharging particulate material comprising in combination:
    a trough-shaped storage hopper having a delivery end and a discharge opening at the lower part of said delivery end, said storage hopper being shaped to receive a bed of particulate material;
    a conveyer screw in said hopper, said conveyer screw having a discharge end within the delivery end of the hopper;
    means for driving said screw to convey material in said hopper toward the discharge end of the screw and the delivery end of the hopper;
    means for swingably supporting the end of said screw remote from its discharge end at a position within the hopper which is remote from said delivery end so that the discharge end of the screw may adjust vertically according to the level of the top surface of the bed of material and discharge material into an area adjacent the top surface of the bed where little or no material is found whereby to minimize the resistance to movement of the discharged material.

2. A device as defined in claim 1 including means for restraining the conveyer screw against sideward movement.

3. A device as defined in claim 1 including means for temporarily fixing the vertical position of said discharge end of the screw.

4. A device as defined in claim 1 including mechanism for spreading, sowing or delivering material from said discharge opening, a drive shaft directly connected with said mechanism, said conveyer screw being connected with said drive shaft through a selectively engageable and disengageable coupling.

5. A device as defined in claim 1 including mechanism for spreading, sowing or delivering material from said discharge opening, a drive shaft directly connected with said mechanism, said conveyer screw being connected with said drive shaft through a slip coupling.

6. A device as defined in claim 1 wherein said means for swingably supporting said screw comprises a universal joint, said means for driving the screw being connected to said universal joint.

7. A device for distributing particulate material uniformly over a surface, which comprises:
    a material-receiving body having hopper-like side walls and an elongate bottom wall portions provided with a discharge opening adjacent one end thereof for gravity discharge of material through such opening;
    distributing means for uniformly distributing particulate material passing through said discharge opening;
    main drive means for continuously operating said distributing means as said body is travelled over the surface which receives the material; and
    Conveyer means for assuring that substantially the entirety of a bed of particulate material received in said body ultimately reaches said discharge opening for gravity flow therethrough, said conveyer means including a conveyer screw having an intake end located remote from said discharge opening and a discharge end located in the region above said discharge opening, means for driving said conveyer screw, and means for pivoting said conveyer screw adjacent its intake end to allow said discharge end thereof freely to rise and fall with the level of material in said body so as to pile material above said discharge opening and to deliver material to the top of such pile.

8. A device according to claim 7 wherein said means for driving said conveyer screw comprises a shaft connected to said main drive means and a universal joint connecting said shaft to said intake end of said conveyer screw and constituting said means for pivoting.

9. A device according to claim 8 wherein said means for driving said conveyer screw includes a coupling device for selectively connecting the conveyer screw to said main drive means.

10. A device according to claim 9 wherein said means for driving said conveyer screw also includes a clutch limiting the torque to said conveyer screw.

11. A device according to claim 7 wherein said means for driving said conveyer screw includes a coupling device for selectively connecting the conveyer screw to said main drive means.

12. A device according to claim 11 wherein said means for driving said conveyer screw also includes a clutch limiting the torque to said conveyer screw.

13. A device according to claim 7 including lever means rotatably engaging said discharge end of the conveyer screw and pivotally connected to said body for selectively raising said discharge end of the conveyer screw to maintain said discharge end exposed as material is introduced into said body.

14. A device according to claim 13 including counterbalance means connected to said lever means for partially counterbalancing the weight of said conveyer screw.

15. A device according to claim 14 wherein said means for driving said conveyer screw comprises a shaft connected to said main drive means and a universal joint connecting said shaft to said intake end of said conveyer screw and constituting said means for pivoting.

16. A device according to claim 15 wherein said means for driving said conveyer screw includes a coupling device for selectively connecting the conveyer screw to said main drive means.

17. A device according to claim 16 wherein said means for driving said conveyer screw also includes a clutch limiting the torque to said conveyer screw.

18. A device according to claim 13 wherein said means for driving said conveyer screw comprises a shaft connected to said main drive means and a universal joint connecting said shaft to said intake end of said conveyer screw and constituting said means for pivoting.

19. A device according to claim 18 wherein said means for driving said conveyer screw includes a coupling device for selectively connecting the conveyer screw to said main drive means.

20. A device according to claim 19 wherein said means for driving said conveyer screw also includes a clutch limiting the torque to said conveyer screw.

21. A device adapted to be moved over the ground surface while discharging particulate material by gravity substantially uniformly on to the ground surface, comprising in combination:

an elongate body having a generally trough-like section within which particulate material tends to repose and a discharge end section having a bottom opening and side walls tending to gravity-discharge particulate material to such opening, said trough-like section being elongate and leading to said discharge end section;

a conveyor screw disposed in said trough-like section, having a discharge end located in the region above said bottom opening and having its opposite end adjacent the opposite end of said trough-like section;

means connected to said opposite end of said conveyor screw to retain such opposite end in the lower region of said opposite end of the trough-like section while allowing said discharge end of the conveyor screw to swing vertically for continuous disposition adjacent the top level of a bed of material in said body; and shaft means for rotating said screw conveyor to deliver material reposing in said trough-like section toward said discharge end section and pile it in the region above said bottom opening.

* * * * *